United States Patent
Hooper

(10) Patent No.: US 11,249,176 B2
(45) Date of Patent: Feb. 15, 2022

(54) SYSTEMS AND ASSOCIATED METHODS FOR MONITORING VESSEL NOISE LEVEL

(71) Applicant: NAVICO HOLDING AS, Egersund (NO)

(72) Inventor: Mathew J. Hooper, Auckland (NZ)

(73) Assignee: NAVICO HOLDING AS, Egersund (NO)

(*) Notice: Subject to any disclaimer, the term of this patent is extended or adjusted under 35 U.S.C. 154(b) by 700 days.

(21) Appl. No.: 16/206,052

(22) Filed: Nov. 30, 2018

(65) Prior Publication Data

US 2020/0174109 A1    Jun. 4, 2020

(51) Int. Cl.
    *G01S 7/00*    (2006.01)
    *G01S 7/56*    (2006.01)
    *G01S 7/52*    (2006.01)
    *G01S 15/89*   (2006.01)

(52) U.S. Cl.
    CPC .......... *G01S 7/56* (2013.01); *G01S 7/52004* (2013.01); *G01S 15/8911* (2013.01)

(58) Field of Classification Search
    USPC .......................................................... 367/7
    See application file for complete search history.

(56) References Cited

U.S. PATENT DOCUMENTS

| | | | | |
|---|---|---|---|---|
| 4,907,208 A * | 3/1990 | Lowrance | ............... | G01S 7/521 367/106 |
| 5,109,364 A * | 4/1992 | Stiner | .................. | G10K 11/006 367/165 |
| 5,184,330 A * | 2/1993 | Adams | .................... | G01S 7/526 367/111 |
| 6,130,641 A * | 10/2000 | Kraeutner | .......... | G01S 7/52003 342/176 |
| 6,842,401 B2 * | 1/2005 | Chiang | .................. | G01S 7/521 367/138 |
| 7,457,196 B2 * | 11/2008 | Acker | ..................... | G01S 7/003 367/88 |
| 7,652,952 B2 * | 1/2010 | Betts | ....................... | G01S 7/521 367/88 |

(Continued)

OTHER PUBLICATIONS

Hendricks, Jim; Sport Fishing Magazine; "The Effects Noise has on Fish—What anglers need to know about sound and fishing"; Jan. 13, 2017; Retrieved from <https://www.sportfishingmag.com/noise-factor-fishing-skills> 5 pages.

(Continued)

*Primary Examiner* — James R Hulka
(74) *Attorney, Agent, or Firm* — Nelson Mullins Riley & Scarborough LLP

(57) ABSTRACT

A marine electronics system is provided including a transducer assembly configured to receive active sonar returns during a first time period and receive passive sonar data during a second time period. The system also includes a marine electronics device including a user interface comprising a display, a processor, and a memory including computer program code configured to cause the marine electronics device to receive the passive sonar data from the transducer element, generate a noise level indicator based on the passive sonar data, and cause the noise level indicator to be displayed on the user interface. The noise level indicator includes an indication of an ambient noise level associated with the vessel.

20 Claims, 6 Drawing Sheets

(56) References Cited

U.S. PATENT DOCUMENTS

| | | | | |
|---|---|---|---|---|
| 8,300,499 | B2* | 10/2012 | Coleman | G01S 15/8902 367/88 |
| 8,305,840 | B2* | 11/2012 | Maguire | G01S 15/96 367/88 |
| 8,514,658 | B2* | 8/2013 | Maguire | G01S 15/89 367/88 |
| 8,605,550 | B2* | 12/2013 | Maguire | G01S 15/89 367/88 |
| 9,135,731 | B2* | 9/2015 | Lauenstein | G01S 7/539 |
| 9,142,206 | B2* | 9/2015 | O'Dell | G10K 11/006 |
| 9,201,142 | B2* | 12/2015 | Antao | G01S 13/862 |
| 9,223,022 | B2* | 12/2015 | Coleman | G01S 15/8902 |
| 9,298,079 | B2* | 3/2016 | Thomas | G03B 42/06 |
| 9,322,915 | B2* | 4/2016 | Betts | G01S 7/6272 |
| 9,335,412 | B2* | 5/2016 | Proctor | G01S 7/56 |
| 9,541,643 | B2* | 1/2017 | Maguire | G01S 15/8902 |
| 9,784,826 | B2* | 10/2017 | Matson | G01S 7/52003 |
| 9,812,118 | B2* | 11/2017 | Matson | G01S 7/524 |
| 10,024,957 | B2* | 7/2018 | Horner | G01S 7/526 |
| 10,024,961 | B2* | 7/2018 | Coleman | G01S 7/52 |
| 10,054,684 | B2* | 8/2018 | Laster | G01S 15/87 |
| 10,114,119 | B2* | 10/2018 | Horner | G01S 15/89 |
| 10,365,366 | B2* | 7/2019 | Lauenstein | G01S 15/10 |
| 10,412,948 | B2* | 9/2019 | Burton | G10K 11/006 |
| 10,545,226 | B2* | 1/2020 | Wigh | G01S 15/42 |
| 10,852,429 | B2* | 12/2020 | Gatland | G01S 7/527 |
| 10,890,660 | B2* | 1/2021 | Wigh | G10K 11/205 |
| 2002/0071345 | A1* | 6/2002 | Chiang | H01Q 3/2682 367/138 |
| 2003/0235112 | A1* | 12/2003 | Zimmerman | G01S 15/89 367/4 |
| 2006/0023570 | A1* | 2/2006 | Betts | G01S 15/107 367/88 |
| 2008/0013404 | A1* | 1/2008 | Acker | G01S 15/02 367/88 |
| 2011/0007606 | A1* | 1/2011 | Curtis | G08B 31/00 367/103 |
| 2011/0013484 | A1* | 1/2011 | Coleman | G01S 15/89 367/88 |
| 2011/0013485 | A1* | 1/2011 | Maguire | G01S 15/89 367/88 |
| 2012/0106300 | A1* | 5/2012 | Maguire | G01S 7/56 367/153 |
| 2013/0016588 | A1* | 1/2013 | O'Dell | G10K 11/006 367/173 |
| 2013/0021876 | A1* | 1/2013 | Maguire | G01S 15/8902 367/88 |
| 2013/0215719 | A1* | 8/2013 | Betts | G01S 7/521 367/88 |
| 2014/0010042 | A1* | 1/2014 | Thomas | G01S 7/6272 367/7 |
| 2014/0064024 | A1* | 3/2014 | Maguire | G01S 7/56 367/7 |
| 2014/0071167 | A1* | 3/2014 | Lauenstein | G01S 15/96 345/634 |
| 2014/0269162 | A1* | 9/2014 | Antao | G01S 13/862 367/7 |
| 2014/0269192 | A1* | 9/2014 | Proctor | G01S 15/89 367/88 |
| 2015/0253425 | A1* | 9/2015 | Coleman | G01S 15/8902 367/7 |
| 2015/0312526 | A1* | 10/2015 | Coleman | H04W 4/02 348/81 |
| 2016/0047906 | A1* | 2/2016 | Matson | G01S 15/06 367/97 |
| 2016/0049143 | A1* | 2/2016 | Matson | G01S 7/526 367/103 |
| 2016/0252635 | A1 | 9/2016 | Urazghildiiev | |
| 2016/0341827 | A1* | 11/2016 | Horner | G01S 15/8902 |
| 2017/0023676 | A1* | 1/2017 | Laster | G01S 15/104 |
| 2017/0082739 | A1* | 3/2017 | Horner | G01S 15/89 |
| 2017/0212230 | A1* | 7/2017 | Wigh | G01S 15/42 |
| 2017/0227639 | A1 | 8/2017 | Stokes et al. | |
| 2017/0363739 | A1* | 12/2017 | Lauenstein | G01S 15/8902 |
| 2018/0100922 | A1* | 4/2018 | Wigh | G01S 7/6272 |
| 2018/0279596 | A1* | 10/2018 | Burton | G01S 15/96 |
| 2018/0313953 | A1* | 11/2018 | Gatland | G01S 7/527 |

OTHER PUBLICATIONS

Bishop, Tony; Bish & Fish; "Does Noise Affect Fishing? Part 1"; Date unknown; Retrieved from <http://www.bishfish.co.nz/articles/salt/noise.htm> 7 pages.

Sea Fish Industry Authority, Seafish Technology; "Noise and Fishing Vessels" Publication Unknown; Retrieved from <https://www.seafish.org/media/Publications/datasheet_88_15_FG.pdf> 6 Pages.

* cited by examiner

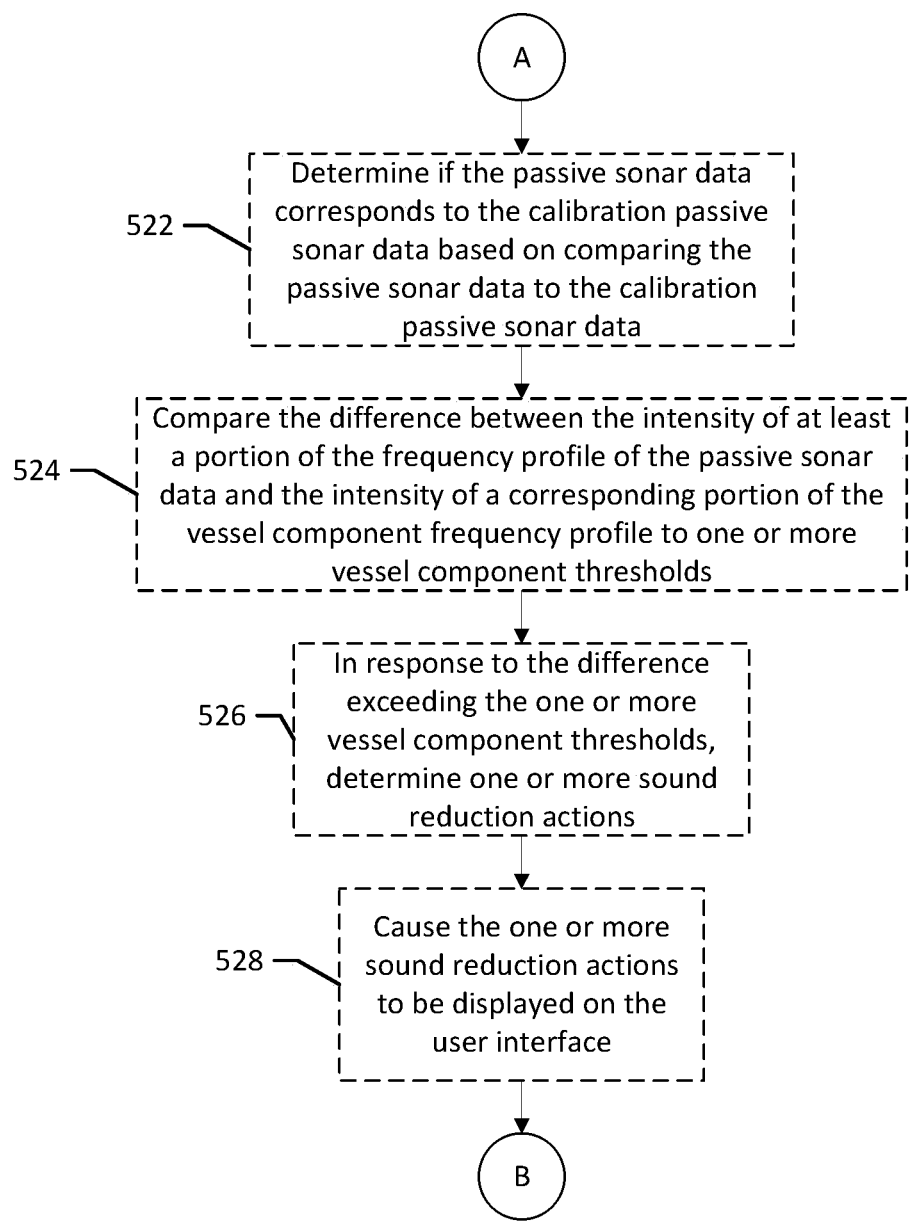

SYSTEMS AND ASSOCIATED METHODS FOR MONITORING VESSEL NOISE LEVEL

FIELD OF THE INVENTION

Embodiments of the present invention relate generally to marine systems and, more particularly, to marine systems, assemblies, and associated methods for monitoring vessel noise level.

BACKGROUND OF THE INVENTION

Vessels, or watercrafts, such as fishing vessels, may include various equipment, such as outboard motors, engines, trolling motors, live well pumps, bilge pumps, fuel transfer pumps, trim pumps, entertainment systems, and the like. Each of these pieces of equipment/systems may generate sound that may be radiated into a body of water surrounding the vessel. In addition to equipment noise, personnel or the movement of the watercraft through the body of water may also cause noise to radiate into the body of water. For example, improper trim of the watercraft may cause cavitation or flow noise along the hull of the watercraft. Personnel may generate noise by heavy walking, stepping on loose decking, dropping items, or the like. These noises may alert fish, which may cause the fish to move away from the watercraft, thereby reducing fishing efficiency.

BRIEF SUMMARY OF THE INVENTION

In some cases, personnel on the vessel may be able to personally monitor sound emitted from the vessel by listening for noises that may cause fish to move away from the vessel, such as pumps starting, a motor or engine running, flow noises, loose decking, or the like. Generally, the personnel may minimize these noises during fishing operations, but may not always be able to identify that noises exist, such as a bilge pump running below decks, flow noise, or the like—particularly from the perspective of being under the water.

In an example embodiment, a marine system is provided that includes a sonar transducers configured to receive active sonar returns from the underwater environment. The transducers are further configured to receive passive sonar data from the underwater environment between active sonar periods. A marine electronics device may receive the passive sonar data and generate a noise level indicator for display on a user interface. The noise level indicator may alert personnel on the watercraft of a high noise condition associated with the vessel, thereby prompting action to reduce or eliminate the noise during fishing operations. In addition to identifying noise to improve fishing, the noise level indicator may also identify abnormal noise levels indicative of equipment malfunction or failure, and/or improper watercraft operations, such as improper trim or ballast.

In addition to generating the noise level indicator, the marine electronics device may also generate sonar images based on the active sonar returns. The sonar images may also be displayed on the user interface.

In some example embodiments, the marine electronics device may compare the passive sonar data to one or more predetermined noise levels and the noise level indicator may indicate exceeding one or more of the predetermined noise levels. For example, the noise level indicator may be color coded based on the predetermined noise levels exceeded. Additionally, or alternatively, the noise level indicator may include a text value, such as a decibel level, or a graphical indication, such as a noise radiation indicia based on the predetermined noise levels exceeded. In an example embodiment, the marine electronics device may be calibrated, such as setting a nominal noise value. For example, the nominal noise value may be set when no equipment is running, such as while the vessel is docked. The one or more predetermined noise levels may be based on, or offset from, the nominal noise value.

In some example embodiments, the marine electronics device may be configured to identify the equipment from which the noise is emanating. The marine electronics device may receive an indication of a vessel component and a corresponding operating condition, for example bilge pump one is running. The marine electronics device may then receive passive sonar data. The marine electronics device may determine that the passive sonar data received corresponds to the vessel component and the noise level indicator may include an indication of the component associated with the noise.

An example embodiment of the present invention includes a marine electronics system including a transducer assembly including a housing configured for mounting to a vessel or a trolling motor associated with the vessel. The transducer assembly includes a transducer element configured to receive active sonar returns from one or more sonar signals emitted into an underwater environment during a first time period and receive passive sonar data during a second time period. The active sonar returns are used to generate one or more sonar images, the passive sonar data corresponds to ambient noise associated with the vessel, and the second time period is different from the first time period. The marine electronics device includes a user interface including a display, a processor, and a memory including computer program code. The computer program code is configured to, with the processor, cause the marine electronics device to receive the passive sonar data from the transducer assembly, generate a noise level indicator based on the passive sonar data, and cause the noise level indicator to be displayed on the user interface. The noise level indicator includes an indication of an ambient noise level associated with the vessel.

In some example embodiments, the transducer element is further configured to transmit the one or more sonar signals into the underwater environment during a third time period. The third time period occurs prior to the first time period and is different than the first time period and the second time period.

In some example embodiments, the transducer element includes a receiving element and the transducer assembly further includes an emitting transducer element configured to transmit the one or more sonar signals into the underwater environment during a third time period. The third time period occurs prior to the first time period and is different than the first time period and the second time period. The emitting transducer element is separate from the receiving element.

In some example embodiments, the memory and computer program code are further configured to, with the processor, cause the marine electronics device to generate one or more sonar images based on the active sonar returns. The one or more sonar images include an image of the underwater environment. The memory and computer program code are further configured to, with the processor, cause the marine electronics device to cause the one or more sonar images to be displayed on the user interface.

In some example embodiments, the memory and computer program code are further configured to, with the processor, cause the marine electronics device to compare the passive sonar data to at least one predetermined noise threshold and generating the noise level indicator is based on the passive sonar data exceeding the at least one predetermined noise threshold. In an example embodiment, the at least one predetermined noise threshold includes a plurality of increasing predetermined noise thresholds and generating the noise level indicator includes generating a noise level indicator indicative of a highest predetermined noise level of the plurality of increasing predetermined noise thresholds that has been exceeded.

In some example embodiments, the memory and computer program code are further configured to, with the processor, cause the marine electronics device to receive an indication of a vessel component and a corresponding operating condition of the vessel component, receive calibration passive sonar data associated with the vessel component while the vessel component is operating, and determine if the passive sonar data received by the transducer element corresponds to the calibration passive sonar data based on comparing the passive sonar data to the calibration passive sonar data. Generating the noise level indicator further includes generating a vessel component indicator that identifies an operating vessel component associated with the noise level indicator.

In some example embodiments, the calibration passive sonar data includes a vessel component frequency profile and comparing the passive sonar data to the calibration passive sonar data includes comparing a frequency profile of the passive sonar data to the vessel component frequency profile. In some example embodiments, comparing a frequency profile of the passive sonar data to the vessel component frequency profile further includes determining a difference between an intensity of noise at a portion of the frequency profile of the passive sonar data and an intensity of noise of the vessel component frequency profile and the memory and computer program code are further configured to, with the processor, cause the marine electronics device to compare the difference to one or more vessel component thresholds in response to the difference exceeding the one or more vessel component thresholds, determine one or more sound reduction actions, and cause the one or more sound reduction actions to be displayed on the user interface.

In some example embodiments, the noise level indicator is a graphical or text indication of the ambient noise level associated with the vessel.

Additional example embodiments of the present invention include apparatuses, methods, systems, and computer program products associated with various embodiments described herein, including, for example, the above described device embodiments.

BRIEF DESCRIPTION OF THE DRAWINGS

Figure 1:
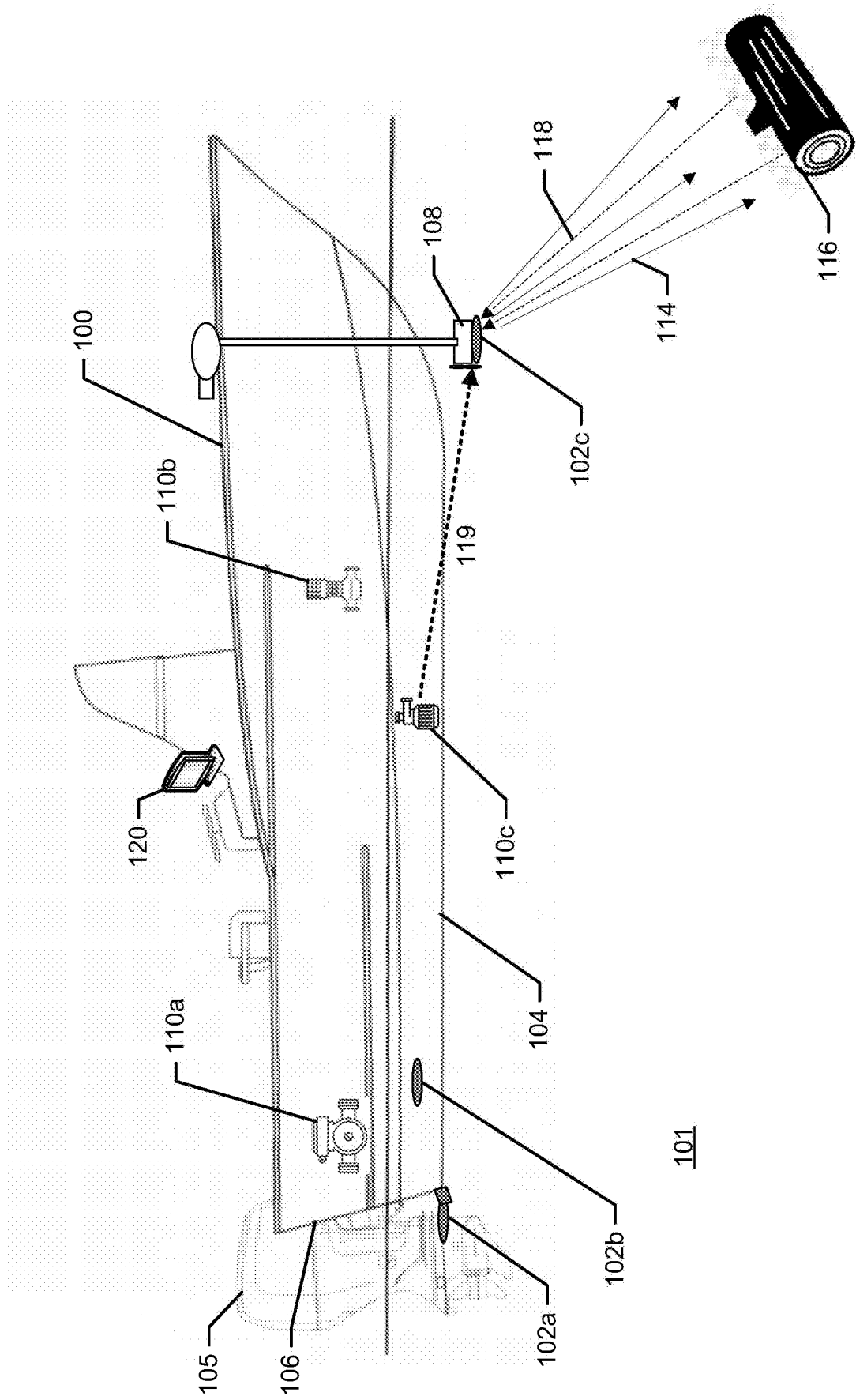
Figure 2:
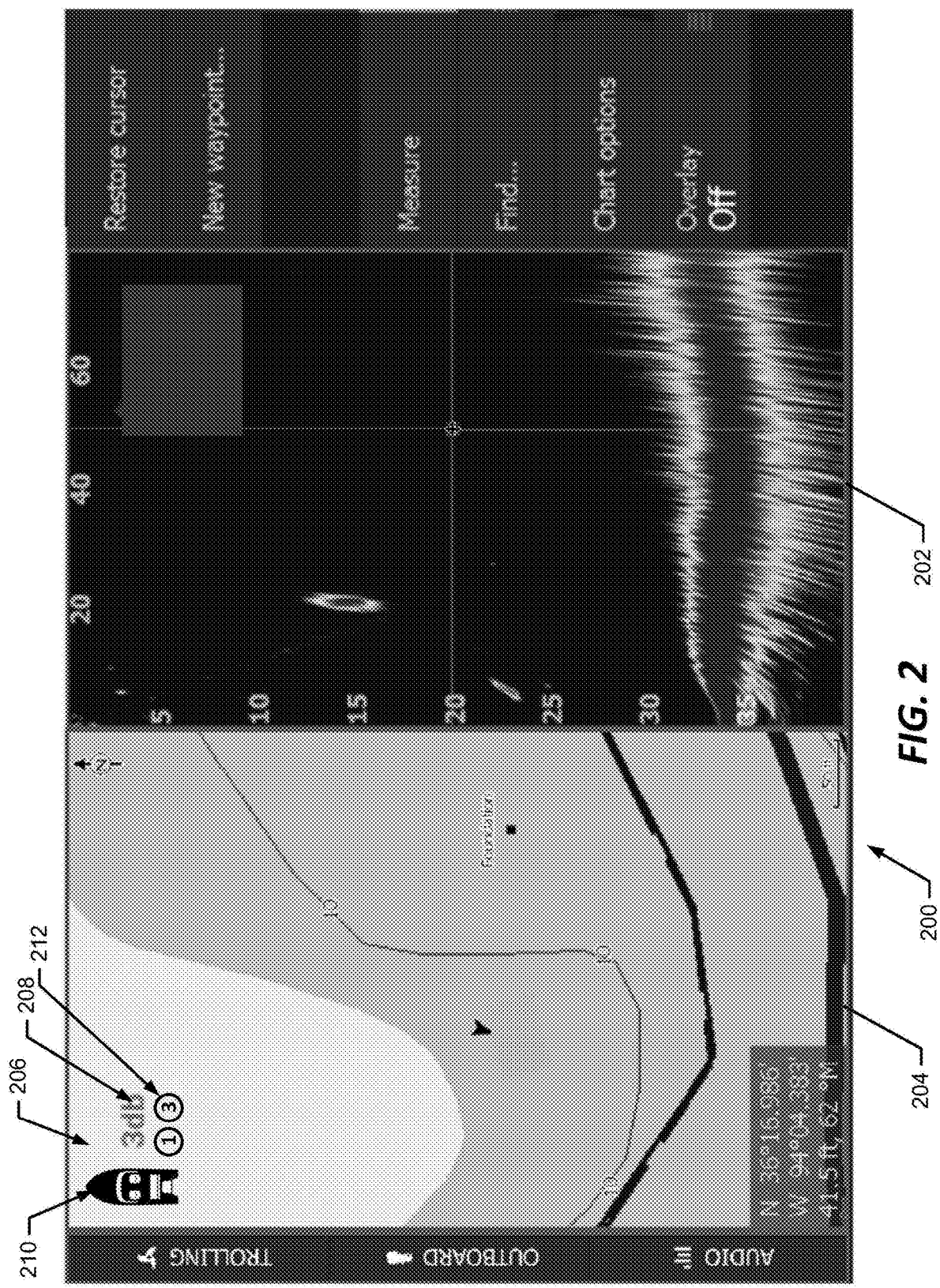
Figure 3A:
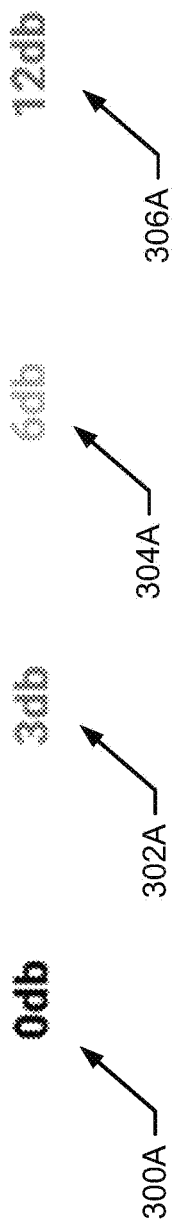
Figure 3B:
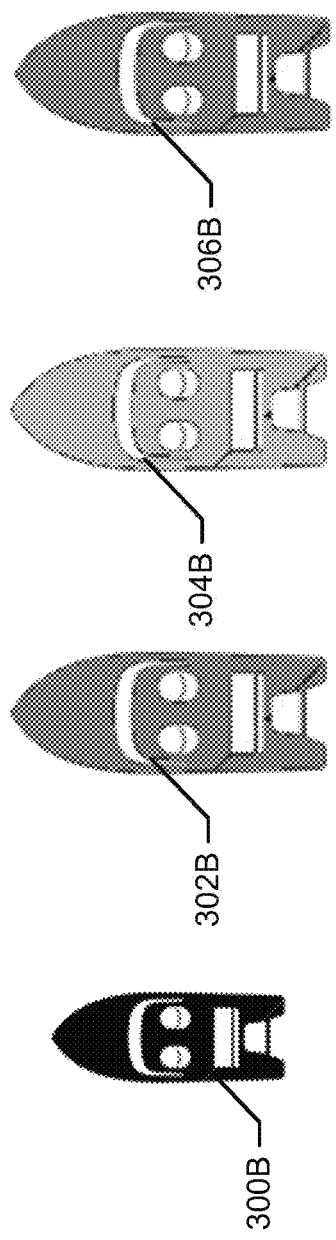
Figure 3C:
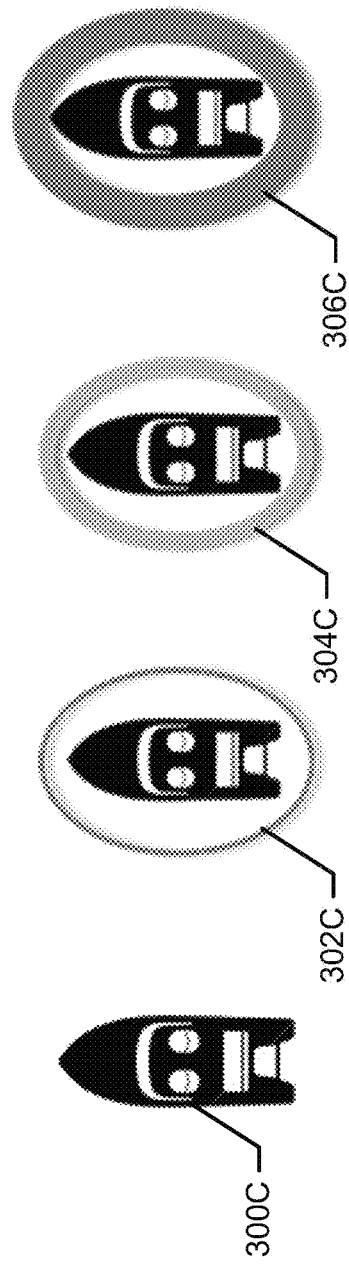
Figure 4:
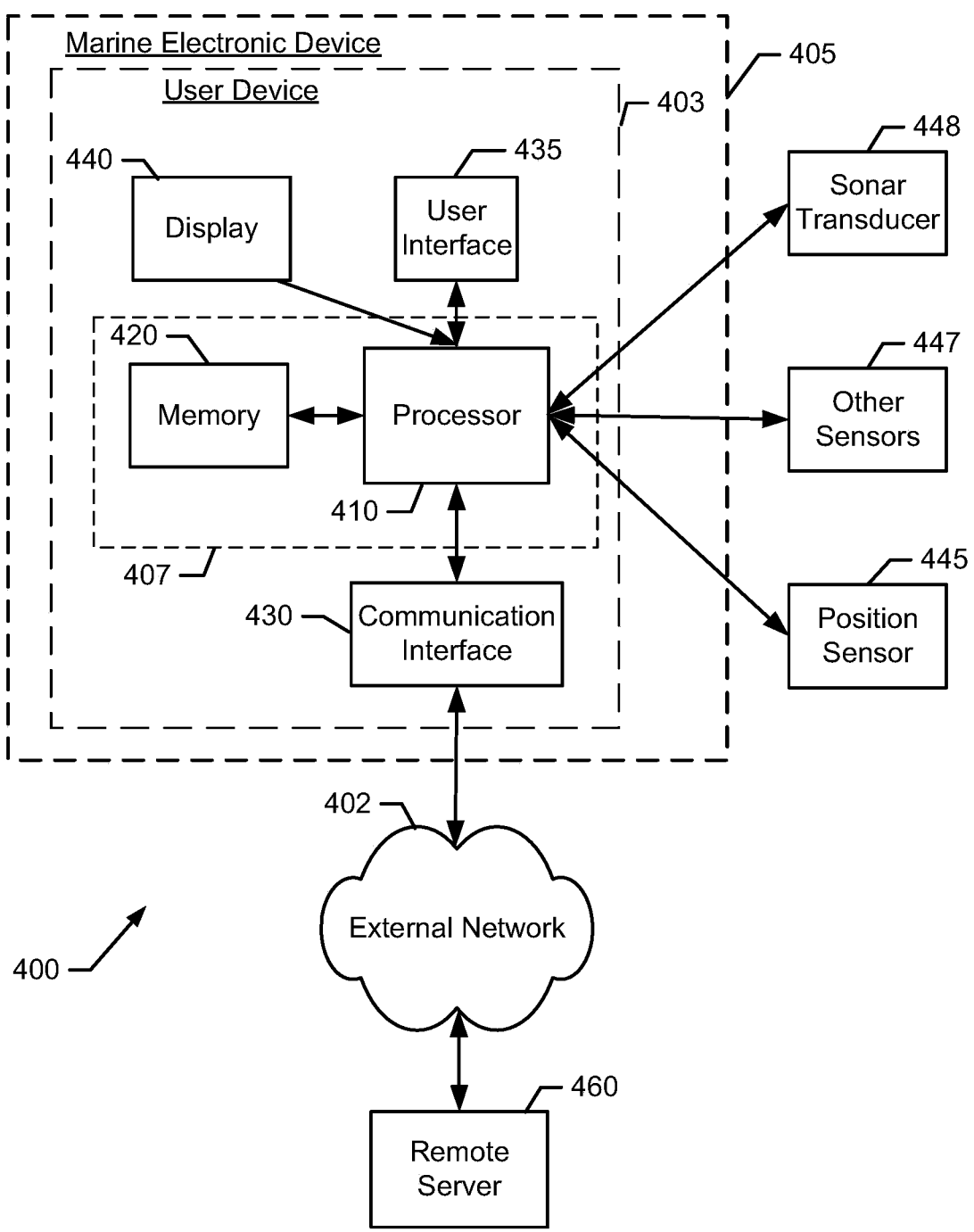
Figure 5:
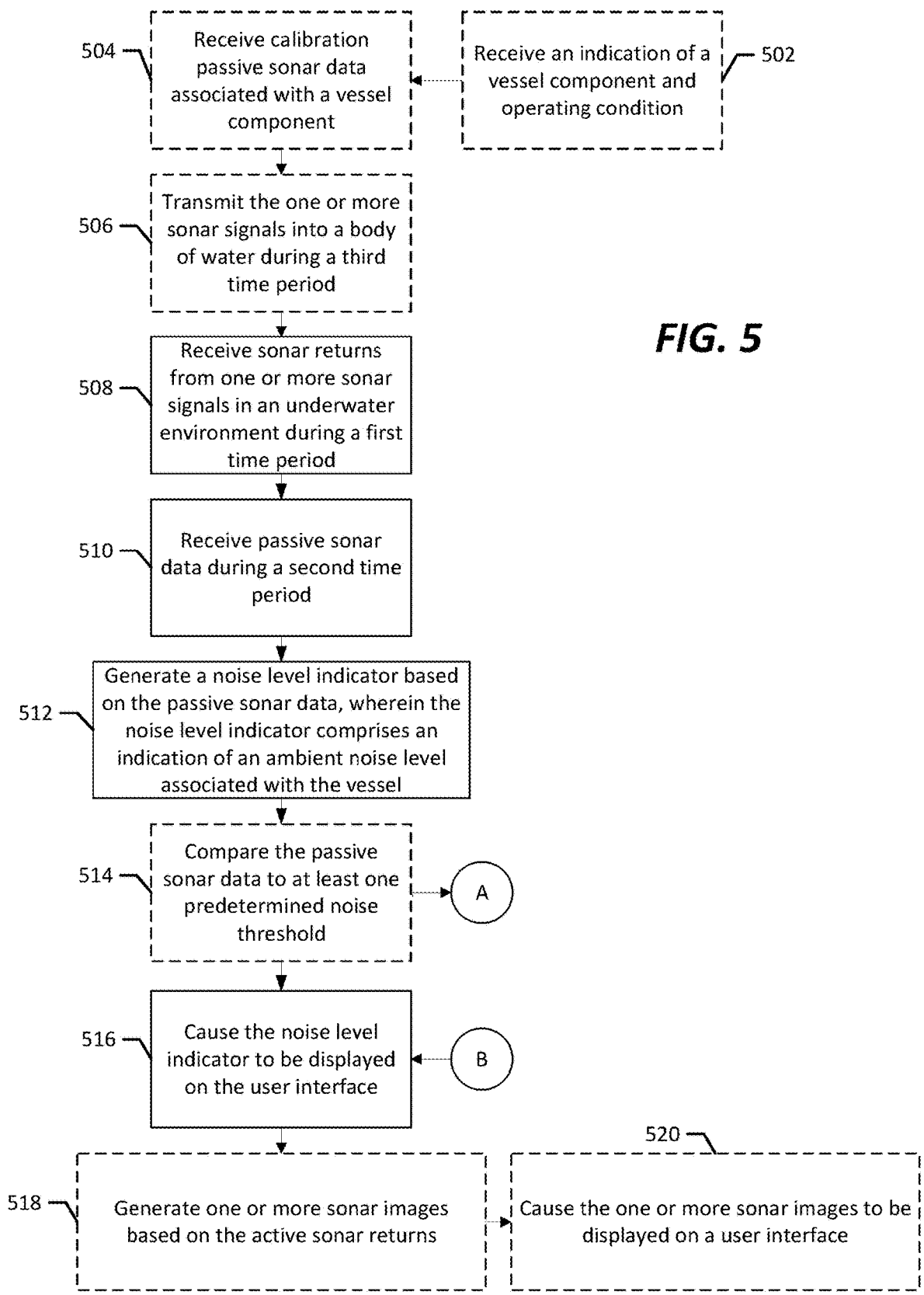

Having thus described the invention in general terms, reference will now be made to the accompanying drawings, which are not necessarily drawn to scale, and wherein:

FIG. 1 illustrates an example watercraft including various sonar transducer assemblies, in accordance with some embodiments discussed herein;

FIG. 2 illustrates an example user interface display including a noise level indicator, in accordance with some embodiments discussed herein;

FIGS. 3A-C illustrate example noise level indicators, in accordance with some embodiments discussed herein;

FIG. 4 shows a block diagram illustrating an example marine electronics system, in accordance with some embodiments discussed herein; and FIGS. 5 and 6 illustrate flowcharts of example methods of monitoring a noise level of a vessel, in accordance with some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

As depicted in FIG. 1, a watercraft, e.g. vessel 100, configured to traverse a marine environment, e.g. body of water 101, may use one or more sonar transducer assemblies 102a, 102b, and 102c disposed on and/or proximate to the vessel. The vessel 100 may be a surface watercraft, a submersible watercraft, or any other implementation known to those skilled in the art. The transducer assemblies 102a, 102b, and 102c may each include one or more transducer elements configured to transmit sonar signals 114, e.g. sound waves, into a body of water, receive sonar return signals, e.g. active sonar returns 118, from the body of water 101, and convert the active sonar returns into sonar return data. This process is generally known as "active sonar."

One or more sonar signals 114 may be generated by the one or more transducer assemblies 102a, 102b, and 102c when deployed in the body of water 101. In some instances, a plurality of transducer elements may be embodied in a transducer assembly. In some instances, the transducer assembly may include one or more of a right scanning (e.g., sidescan) element, a left scanning (e.g., sidescan) element, a conical downscan sonar element, and/or a bar (e.g., linear, elongated rectangle, or the like) downscan sonar element, which may be housed within a transducer housing. In some example embodiments, the transducer assembly may be a transducer array, e.g. a "phased array."

The transducers may transmit one or more sonar signals 114, e.g. sonar beams, into a body of water 101 with an emitting transducer, an emit/receive transducer, or similar device. When the sound waves, of the sonar beams, strike anything of differing acoustic impedance (e.g., the sea floor or something suspended in the water above the bottom), the sound waves reflect off that object 116. These echoes (or active sonar returns 118) may strike the emitting transducer element and/or a separate one or more sonar receiver elements, which convert the echoes back into an electrical signal which is processed by a processor (e.g., processing circuity 407, as discussed in reference to FIG. 4) and sent to a display (e.g., an LCD) mounted in the cabin or other convenient location in the watercraft. This process is often called "sounding". Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to build a picture on the display of the underwater environment, e.g. a sonar image.

In an example embodiment, the one or more transducers assemblies 102a, 102b, and 102c may include multiple transducer arrays and/or transducer elements cooperating to receive active sonar returns 118 from the underwater environment. The transducer arrays and/or transducer elements may be arranged in a predetermined configuration, e.g. relative positions, including known distances between each transducer array or transducer element. The relative positions and known distances between the transducer arrays and/or transducer elements may be used to resolve an angle associated with the active sonar returns 118 (and, for example, a corresponding object in the underwater environment). The respective angles determined by the relative positions and known distances of the transducer arrays or transducer elements may be compared and combined to generate a two-dimensional and/or a three-dimensional position of the active sonar returns 118 (and, for example, a corresponding representation of an object 116 in the underwater environment 101).

In addition to active sonar, the transducer assemblies 102a, 102b, and 102c or individual transducer elements may also collect sonar data during a period between active sonar operations, e.g. passive sonar data. Passive sonar data includes measurements of sound intensity and/or frequency of the underwater environment. Passive sonar data is not typically measured in response to a transmitted sonar signal, but may include sonar signal transmissions from other transducer assemblies 102a, 102b, 102c, or sonar signal transmissions from other vessels. The passive sonar data may include sounds generated by the vessel 100, components of the vessel 100, the body of water 101, interaction between the vessel 100 and the body of water 101, noise from other vessels, or the like.

In an example embodiment, a vessel 100 may include a main propulsion motor 105, such as an outboard or inboard motor. Additionally, the vessel 100 may include a trolling motor 108 (or other secondary propulsion system) configured to propel the vessel 100 or maintain a position. The one or more transducer assemblies 102a, 102b, and/or 102c may be mounted in various positions and to various portions of the vessel 100 and/or equipment associated with the vessel 100. For example, the transducer assemblies may be mounted to the transom 106 of the vessel 100 (such as depicted by transducer assembly 102a), may be mounted to the bottom or side of the hull 104 of the vessel 100 (such as depicted by transducer assembly 102b), or may be mounted to the trolling motor 108 (such as depicted by transducer assembly 102c). In some embodiments, the vessel 100 may include additional vessel components, such as pumps 110a, 110b, 110c. For example, the pumps may include a fuel pump or transfer pump 110a, a live well pump 110b, and/or a bilge pump 110c.

To explain, example passive sonar data 119 that is captured by the transducer assembly 102c is illustrated in FIG. 1. In the illustrated embodiment, the bilge pump 110c is operating and causing noise that is picked up by the transducer assembly 102c (e.g., as passive sonar data). Notably, though not shown, if the vessel 100 were equipped with the other transducer assemblies 102a and 102b, and they were so configured, they too may receive passive sonar data from the operating bilge pump 110c.

FIG. 2 illustrates an example user interface display 200 of a marine electronics device. The user interface display 200 may include various display screens for various functionality of the marine electronics device, such as audio control display, vessel parameters display, e.g. speed, heading, trim, or the like, a sonar display 202, a navigation chart 204, or the like. Notably, the display 200 also includes an example noise level indicator 206.

In an example embodiment, the vessel 100 may include a marine electronics device, such as marine electronics device 405 described below in reference to FIG. 4, configured to monitor the noise level of the vessel 100. The marine electronics device 405 may receive sonar return data from one or more sonar transducer assemblies 102a, 102b, 102c and generate one or more sonar images based on the active sonar returns. These sonar images may be displayed, for example, in the sonar display 202.

Additionally, the marine electronics device 405 may receive passive sonar data using the one or more transducer assemblies 102a, 102b, 102c (e.g., the same transducer assembly that also received the active sonar returns). The marine electronics device 405 may determine an ambient noise level of the vessel 100 based on the passive sonar data and generate a noise level indicator 206. The noise level indicator 206 may be displayed on the user interface display 200 to indicate to a user the ambient noise level associated with the vessel 100. The noise level indicator 206 may prompt user's action to reduce or eliminate the noise during fishing operations. In addition to identifying noise to improve fishing, the noise level indicator 206 may also identify abnormal noise levels indicative of equipment malfunction or failure, and/or improper watercraft operations, such as improper trim or ballast.

In an example embodiment, the active sonar returns 118 may be received during a first time period and the passive sonar data may be received during a second time period that is different from the first time period. In some example embodiments, the transducer assembly 102a, 102b, 102c, may also transmit the one or more sonar signals, in addition to receiving the active sonar returns and the passive sonar data. The transducer assembly 102a, 102b, 102c may transmit the one or more sonar signals 114 during a third time period that is different from the first and second time period. For example, the transducer assembly 102a, 102b, 102c may first transmit the one or more sonar signals into the underwater environment. Next, the transducer assembly 102a, 102b, 102c may receive the active sonar returns 118 from one or more sonar signals emitted into an underwater environment. Finally, prior to the next active sonar transmission and/or active sonar return receipt, the transducer assembly 102a, 102b, and 102c may receive the passive sonar data. The marine electronic device 405 may determine the noise level based on the passive sonar data and generate a noise level indicator 206 for display on the user interface.

In some example embodiments, the noise level indicator 206 may include textual information, such as a decibel level 208, or other suitable text information identifying the noise level. In some example embodiments, the noise level indicator 206 may include a visual representation indication of a noise level, such a vessel icon 210. The vessel icon 210, may be displayed in different colors, or darkness in grey scale, may include an indication of radiated noise, or other suitable visual indicator.

In some example embodiments, the marine electronics device 405 may compare the passive sonar data to at least one predetermined noise threshold, such as three decibels, six decibels, twelve decibels, or the like. Generating the noise level indicator 206 may be based on the passive sonar data exceeding the at least one predetermined noise threshold.

The noise thresholds may be based on raw passive sonar data or may be based on a noise level above a calibration level. In this regard, in some example embodiments, a calibration level may be set next to a pier, as the vessel is docked, or in open water. An operator may turn off all engines, motors, pumps, or other vessel components and, using the user interface, may enter a user input to set the calibration level. In some embodiments, the marine electronics device may use current passive sonar data as a baseline noise level, or nominal noise value from which the one or more predetermined noise thresholds are offset from. In some embodiments, such as described further herein, a user may turn on various components of the vessel in various order to enable calibration of the noise threshold level corresponding to each component in an operating condition (such as may be used in various embodiments described herein). In some embodiments, various components can be turned on together to help calibrate noise threshold levels.

FIGS. 3A-C illustrate example noise level indicators, in accordance with some embodiments discussed herein, which may, in some embodiments, correspond to different noise level thresholds. The noise level indicators 300A, 300B, and 300C are associated with an example noise level, or noise threshold, of zero decibels. Noise level indicators 302A, 302B, and 302C are associated with another example noise level, or noise threshold, of three decibels. Noise level indicators 304A, 304B, and 304C are associated with yet another example noise level, or noise threshold, of six decibels. Noise level indicators 306A, 306B, and 306C are associated with yet another example noise level, or noise threshold, of twelve decibels. Although certain decibel levels are shown and described, other decibel levels or noise levels may be used for the various noise level thresholds.

Noise level indicators 300A, 302A, 304A, and 306A, depicted in FIG. 3A, include text values, e.g. decibel values, for each decibel level or predetermined noise threshold. Additionally, the color of the text value may change based on the decibel level, such as black for zero decibels, green for three decibels, yellow for six decibels, and red at twelve decibels.

Noise level indicators 300B, 302B, 304B, and 306B, depicted in FIG. 3B, include a vessel icon that changes color based on the decibel level or predetermined noise threshold, such as black for zero decibels, green for three decibels, yellow for six decibels, and red at twelve decibels. In some example embodiments, the darkness or size of the vessel icon may change, such as on a grey scale user interface.

Noise level indicators 300C, 302C, 304C, and 306C, depicted in FIG. 3C, include a vessel icon and a noise ring that changes color based on the decibel level or predetermined noise threshold, such as black for zero decibels, green for three decibels, yellow for six decibels, and red at twelve decibels. In addition, the size of the noise ring may increase in diameter and thickness as the noise level or exceeded noise level threshold increases.

Returning to FIG. 2, in some example embodiments, the noise level indicator 206 may indicate a vessel component associated with the detected noise. In the depicted example, the noise level indicator 206 includes a component identifier 212 indicating that vessel component one and vessel component three are the likely source of the detected noise. Although depicted as numbers, the component identifiers 212 may be any other suitable indicator, such as an icon associated with the vessel component, text name of the vessel component, or the like. In an example embodiment, the marine electronics device 405 may include calibration passive sonar data for one or more of the vessel components. The calibration passive sonar data may include a vessel component frequency profile. The vessel component frequency profile may be received from a manufacturer, such as preprogrammed in a memory based on the vessel or vessel type, may be retrieved from a remote memory, such as a remote server, such as based on user input identifying one or more vessel components, may be detected during a calibration process, or may be manually entered.

In an example embodiment, the vessel component sonar data may be manually entered utilizing the user interface. The user may identify a vessel component, such as by entering the name of the vessel component, selecting a component number or icon, or the like. The user may then identify the operating condition of the vessel component, such as on, operating speed, or the like. The marine electronics device 405 may receive passive sonar data from transducer assembly 102a, 102b, 102c and store the passive sonar data as calibration passive sonar data for the identified vessel component. In some example embodiments, the calibration passive sonar data for each vessel component may include a vessel component frequency profile for the indicated vessel component. The user may repeat these operations to generate or enter calibration passive sonar data for additional vessel components.

The marine electronics device 405 may compare the passive sonar data received from the one or more transducer assemblies 102a, 102b, 102c to the calibration passive sonar data for one or more component vessels. For example, the marine electronics device 405 may compare a frequency profile of the passive sonar data to the vessel component frequency profiles to determine a best match. The marine electronics device 405 may assign a match value to one or more of the vessel component frequency profiles and determine that the passive sonar data corresponds to one or more vessel components based on the highest match value or values. Based on the determination of one or more vessel components that correspond to the passive sonar data, the marine electronics device 405 may generate a noise level indicator 206 that includes one or more component identifiers 212 corresponding to the vessel components determined to correspond to the passive sonar data.

In some example embodiments, the marine electronics device 405 may be further configured to determine one or more sound reduction actions based on the passive sonar data. In an example embodiment, the marine electronics device 405 may determine a sound reduction action based on identifying a running vessel component. Some example sound reduction actions may include turning off unnecessary vessel components, such as pumps. The marine electronics device may display one or more sound reductions actions on a user interface, such that the user may take the sound reductions actions. For example, the vessel component identified may be the bilge pump 110c and the sound reduction action may include "Check bilge levels and turn off bilge pump" and/or "Switch bilge pumps to automatic". If the vessel component identified includes the live well pump 110b, the sound reduction actions may include "If no fish in live well, turn off live well pump" and/or "Switch live well pump to low speed".

In some example embodiments, the marine electronics device 405 may determine a difference in noise intensity value of at least a portion of the frequency profile of the passive sonar data and a corresponding portion of the of the vessel component frequency profile. A substantial noise difference may indicate that a vessel component is failing or may need adjustment. The marine electronics device 405 may compare the difference to one or more vessel component thresholds. The sound reductions actions may be based on exceeding one or more of the vessel component thresholds. For example, exceeding a vessel component threshold for the trolling motor may indicate a damaged propeller or motor and the sound reduction action may include "Check trolling motor propeller or motor". As more examples, the sound reduction action for exceeding a vessel component threshold for a pump 110a, 110b, 110c, may include reducing the pump speed, checking a suction port associated with the pump, or turning the pump off.

Example System Architecture

FIG. 4 shows a block diagram of an example marine system 400 capable for use with several embodiments of the present invention. As shown, the marine system 400 may include a number of different modules or components, each of which may comprise any device or means embodied in either hardware, software, or a combination of hardware and software configured to perform one or more corresponding functions. For example, the marine system 400 may include a marine electronics device 405.

The marine system 400 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays (e.g. a marine electronics device 405) may be included in the marine system 400.

The marine electronics device 405 may include a processor 410, a memory 420, a user interface 435, a display 440, one or more sensors (e.g. position sensor 445, orientation sensor (not shown), etc.), and a communication interface 430.

The processor 410 and memory 420 may form processing circuitry 407. The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide route data for navigation of a vehicle, such as a watercraft. For example, the processor 410 may be configured to receive route data and user input associated with the route data to generate or modify a route for display to a user (e.g. on display 440/user interface 435).

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

The memory 420 may be configured to store instructions, computer program code, marine data, such as sonar data, chart data, location/position data, and other data associated with the navigation system in a non-transitory computer readable medium for use, such as by the processor.

The communication interface 430 may be configured to enable connection to external systems (e.g. an external network 402). In this manner, the marine electronics device 405 may retrieve stored data from a remote, external server via the external network 402 in addition to or as an alternative to the onboard memory 420.

The position sensor 445 may be configured to determine the current position and/or location of the marine electronics device 405. For example, the position sensor 445 may comprise a GPS, bottom contour, inertial navigation system, such as microelectro-mechanical sensor (MEMS), a ring laser gyroscope, or the like, or other location detection system.

The display 440 may be configured to display images and may include or otherwise be in communication with a user interface 435 configured to receive an input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigation chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 4 is shown as being directly connected to the processor 410 and within the marine electronics device 405, the display 440 could alternatively be remote from the processor 410 and/or marine electronics device 405. Likewise, in some embodiments, the position sensor 445 and/or user interface 135 could be remote from the marine electronics device 405.

The marine electronics device 405 may include one or more other sensors 447. In some embodiments, the other sensors 447 may be condition parameter sensors configured to measure environmental condition parameters. The condition parameter sensors may include, for example, an air temperature sensor, a water temperature sensor, a current sensor, a light sensor, a wind sensor, a speed sensor, or the like. The environmental parameters may be associated with collected sonar data and/or user input, such as fishing logs, e.g. fishing data.

The sonar transducer 448 (e.g., transducer assemblies 102a, 102b, 102c) may be housed in a trolling motor housing, attached to the watercraft or trolling motor, or, in some cases, be castable. The sonar transducer 448 may be configured to gather sonar data, e.g. active sonar returns, from the underwater environment relative to the watercraft. Accordingly, the processor 410 may be configured to receive the active sonar returns from the sonar transducer 448, process the active sonar returns to generate an image including a sonar image based on the gathered active sonar returns. In some embodiments, the marine electronics device 405 may be used to determine depth and bottom contours, detect fish, locate wreckage, etc. Sonar signals, e.g. beams or pulses, from a sonar transducer 448, can be transmitted into the underwater environment. The sonar signals reflect off objects in the underwater environment (e.g. fish, structure, sea floor bottom, etc.) and return to the transducer assembly, which converts the active sonar returns into sonar data that can be used to produce an image of the underwater environment.

Additionally, the sonar transducer 448 may be configured to receive passive sonar data between active sonar operations, such as between sets of sonar signal transmissions and sonar return receipts. The marine electronics device 405 may be used to determine a noise level of the watercraft and surrounding underwater environment and generate a noise level indicator.

Example Flowchart(s) and Operations

Embodiments of the present invention provide methods, apparatus and computer program products for monitoring a noise level of a vessel. Various examples of the operations performed in accordance with embodiments of the present invention will now be provided with reference to FIGS. 5 and 6.

FIGS. 5 and 6 illustrate flowcharts according to an example method for monitoring a vessel noise level according to an example embodiment. The operations illustrated in and described with respect to FIGS. 5 and 6 may, for example, be performed by, with the assistance of, and/or under the control of the marine electronics device 405 including processing circuitry 407, the processor 410, memory 420, communication interface 430, user interface 435, position sensor 445, other sensors 447, sonar transducer 448, and/or display 440.

The method of monitoring a vessel noise level depicted in FIGS. 5 and 6 may include receiving sonar returns from one or more sonar signals in an underwater environment during a first time period at operation 508, receiving passive sonar data during a second time period at operation 510, generating a noise level indicator based on the passive sonar data, wherein the noise level indicator comprises an indication of an ambient noise level associated with the vessel at operation 512, and causing the noise level indicator to be displayed on the user interface at operation 516.

In some embodiments, the method of monitoring the noise level of the vessel may include additional, optional operations, and/or the operations described above may be modified or augmented. Some examples of modifications, optional operations, and augmentations are described below, as indicated by dashed lines, such as receiving an indication of a vessel component and operating condition at operation 502, receiving calibration passive sonar data associated with a vessel component at operation 504, and transmitting the one or more sonar signals into a body of water during a third time period at operation 506. In some example embodiments, the method may also include comparing the passive sonar data to at least one predetermined noise threshold at operation 514, generating one or more sonar images based on the active sonar returns at operation 518, and causing the one or more sonar images to be displayed on a user interface at operation 520. In some example embodiments, the method may also include determining if the passive sonar data corresponds to the calibration passive sonar data based on comparing the passive sonar data to the calibration passive sonar data at operation 522, comparing the difference between the intensity of at least a portion of the frequency profile of the passive sonar data and the intensity of a corresponding portion of the vessel component frequency profile to one or more vessel component thresholds at operation 524, determining one or more sound reduction actions in response to the difference exceeding the one or more vessel component thresholds at operation 526, and causing the one or more sound reduction actions to be displayed on the user interface at operation 528.

FIGS. 5 and 6 illustrate flowcharts of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processing circuitry 407. As will be appreciated, any such computer program product may be loaded onto a computer or other programmable apparatus (for example, a marine electronics device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example a marine electronics device 405) to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A marine electronics system comprising:
a transducer assembly including a housing configured for mounting to a vessel or a trolling motor associated with the vessel, wherein the transducer assembly comprises:
a transducer element configured to:
receive active sonar returns from one or more sonar signals emitted into an underwater environment during a first time period, wherein the active sonar returns are used to generate one or more sonar images; and
receive passive sonar data during a second time period, wherein the passive sonar data corresponds to ambient noise associated with the vessel, wherein the second time period is different from the first time period; and
a marine electronics device comprising:
a user interface comprising a display;
a processor; and
a memory including computer program code configured to, with the processor, cause the marine electronics device to:
receive the passive sonar data from the transducer assembly;
generate a noise level indicator based on the passive sonar data, wherein the noise level indicator comprises an indication of an ambient noise level associated with the vessel; and
cause the noise level indicator to be displayed on the user interface.

2. The marine electronics system of claim 1, wherein the transducer element is further configured to:
transmit the one or more sonar signals into the underwater environment during a third time period, wherein the third time period occurs prior to the first time period and is different than the first time period and the second time period.

3. The marine electronics system of claim 1, wherein the transducer element comprises a receiving element and the transducer assembly further comprises:
an emitting transducer element configured to transmit the one or more sonar signals into the underwater environment during a third time period, wherein the third time period occurs prior to the first time period and is different than the first time period and the second time period, wherein the emitting transducer element is separate from the receiving element.

4. The marine electronics system of claim 1, wherein the memory and computer program code are further configured to, with the processor, cause the marine electronics device to:
generate one or more sonar images based on the active sonar returns, wherein the one or more sonar images comprise an image of the underwater environment; and
cause the one or more sonar images to be displayed on the user interface.

5. The marine electronics system of claim 1, wherein the memory and computer program code are further configured to, with the processor, cause the marine electronics device to:
compare the passive sonar data to at least one predetermined noise threshold,
wherein generating the noise level indicator is based on the passive sonar data exceeding the at least one predetermined noise threshold.

6. The marine electronics system of claim 5, wherein the at least one predetermined noise threshold comprises a plurality of increasing predetermined noise thresholds, and
wherein generating the noise level indicator comprises generating a noise level indicator indicative of a highest predetermined noise level of the plurality of increasing predetermined noise thresholds that has been exceeded.

7. The marine electronics system of claim 1, wherein the memory and computer program code are further configured to, with the processor, cause the marine electronics device to:
receive an indication of a vessel component and a corresponding operating condition of the vessel component;
receive calibration passive sonar data associated with the vessel component while the vessel component is operating; and
determine if the passive sonar data received by the transducer element corresponds to the calibration passive sonar data based on comparing the passive sonar data to the calibration passive sonar data;
wherein generating the noise level indicator further comprises generating a vessel component indicator that identifies an operating vessel component associated with the noise level indicator.

8. The marine electronics system of claim 7, wherein the calibration passive sonar data includes a vessel component frequency profile, and
wherein comparing the passive sonar data to the calibration passive sonar data comprises comparing a frequency profile of the passive sonar data to the vessel component frequency profile.

9. The marine electronics system of claim 8, wherein comparing a frequency profile of the passive sonar data to the vessel component frequency profile further comprises determining a difference between an intensity of noise at a portion of the frequency profile of the passive sonar data and an intensity of noise of the vessel component frequency profile, and
wherein the memory and computer program code are further configured to, with the processor, cause the marine electronics device to:
compare the difference to one or more vessel component thresholds;
in response to the difference exceeding the one or more vessel component thresholds, determine one or more sound reduction actions; and
cause the one or more sound reduction actions to be displayed on the user interface.

10. The marine electronics system of claim 1, wherein the noise level indicator is a graphical or text indication of the ambient noise level associated with the vessel.

11. A method of indicating an ambient noise level associated with a vessel, wherein the method comprises:
receiving active sonar returns from one or more sonar signals emitted into an underwater environment during a first time period, wherein the active sonar returns are received by a transducer element of a transducer assembly, wherein the transducer assembly includes a housing configured for mounting to a vessel or a trolling motor associated with the vessel, and wherein the active sonar returns are used to generate one or more sonar images; and
receiving, by the transducer element, passive sonar data at a second time period, wherein the second time period is different from the first time period;

receiving, at a marine electronics device, the passive sonar data from the transducer element during a second time period, wherein the second time period is different from the first time period;

generating, by a processor of the marine electronics device, a noise level indicator based on the passive sonar data, wherein the noise level indicator comprises an indication of the ambient noise level associated with the vessel; and causing the noise level indicator to be displayed on a user interface.

12. The method of claim 11 further comprising transmitting, from the transducer element, the one or more sonar signals into the underwater environment during a third time period, wherein the third time period occurs prior to the first time period and is different than the first time period and the second time period.

13. The method of claim 11, wherein the transducer element comprises a receiving element and the transducer assembly further comprises an emitting transducer element configured to transmit the one or more sonar signals into the underwater environment during a third time period, wherein the third time period occurs prior to the first time period and is different than the first time period and the second time period, wherein the emitting transducer element is distinct from the receiving element.

14. The method of claim 11 further comprising:
generating one or more sonar images based on the active sonar returns, wherein the one or more sonar images comprises an image of the underwater environment; and
causing the one or more sonar images to be displayed on the user interface.

15. The method of claim 11 further comprising:
comparing the passive sonar data to at least one predetermined noise threshold,
wherein generating the noise level indicator is based on the passive sonar data exceeding the at least one predetermined noise threshold.

16. The method of claim 15, wherein the at least one predetermined noise threshold comprises a plurality of increasing predetermined noise thresholds, and
wherein generating the noise level indicator comprises generating a noise level indicator indicative of a highest predetermined noise level of the plurality of increasing predetermined noise thresholds that has been exceeded.

17. The method of claim 11 further comprising:
receiving an indication of a vessel component and a corresponding operating condition of the vessel component;
receiving calibration passive sonar data associated with the vessel component while the vessel component is operating; and
determining if the passive sonar data received by the transducer element corresponds to the calibration passive sonar data based on comparing the passive sonar data to the calibration passive sonar data;
wherein generating the noise level indicator further comprises generating a vessel component indicator that identifies an operating vessel component associated with the noise level indicator.

18. The method of claim 17, wherein the calibration passive sonar data includes a vessel component frequency profile, and
wherein comparing the passive sonar data to the calibration passive sonar data comprises comparing a frequency profile of the passive sonar data to the vessel component frequency profile.

19. The method of claim 18, wherein comparing a frequency profile of the passive sonar data to the vessel component frequency profile further comprises determining a difference between an intensity of noise at a portion of the frequency profile of the passive sonar data and an intensity of noise of the vessel component frequency profile, and
wherein the method further comprises:
comparing the difference to one or more vessel component thresholds;
in response to the difference exceeding the one or more vessel component thresholds, determining one or more sound reduction actions; and
causing the one or more sound reduction actions to be displayed on the user interface.

20. A marine electronics device comprising:
a user interface comprising a display;
a processor; and
a memory including computer program code configured to, with the processor, cause the marine electronics device to:
receive active sonar return data from a transducer assembly, wherein the active sonar return data corresponds to active sonar returns from one or more sonar signals emitted into an underwater environment during a first time period, wherein the active sonar returns are received by a transducer element of the transducer assembly, wherein the transducer assembly includes a housing configured for mounting to a vessel or a trolling motor associated with the vessel, and wherein the active sonar returns are used to generate one or more sonar images; and
receive passive sonar data received by the transducer element during a second time period, wherein the second time period is different from the first time period;
generate a noise level indicator based on the passive sonar data, wherein the noise level indicator comprises an indication of the ambient noise level associated with the vessel; and
cause the noise level indicator to be displayed on the user interface.

* * * * *